United States Patent

[11] 3,630,141

[72] Inventor Mahmoud Amin Elshazly
    132 Schmitz Terrace, Mt. Arlington, N.J. 07956
[21] Appl. No. 24,145
[22] Filed Mar. 31, 1970
[45] Patented Dec. 28, 1971

[54] TABLEWARE JUICE DISPENSER
    1 Claim, 4 Drawing Figs.

[52] U.S. Cl. .................................................... 100/234
[51] Int. Cl. .................................................... B30b 7/00
[50] Field of Search .......................................... 150/234;
                                        241/169; 146/3.9 J; D89/1.1

[56] References Cited
    UNITED STATES PATENTS
    995,286    6/1911   Pender ........................ 100/234
    2,829,588  4/1958   Battke ......................... 100/234
    2,348,304  5/1944   Nudelman et al ............. 100/234 X
    D201,268   6/1965   Bode ........................... 100/234 X
    2,735,360  2/1956   Battke ......................... 100/234
    FOREIGN PATENTS
    728,659    4/1955   Great Britain ................ 100/234
    545,978    7/1956   Italy ............................. 100/234

Primary Examiner—Billy J. Wilhite
Attorney—Whittemore, Hulbert and Belknap

ABSTRACT: A piece of table silverware designed to supplement the usual silverware such as knife, fork and spoon and useful for neatly dispensing the juice from a lemon wedge. A pair of hinged jaws are of a size and shape corresponding to the diverging faces of a lemon wedge. Each jaw has an extension, one for the thumb and the other for the finger, and there is a pan at the hinge side of the jaws for collecting the juice when the jaws are squeezed, the pan being closed except at a nozzle which directs the juice to the desired place.

PATENTED DEC 28 1971
3,630,141
FIG.1
FIG.3
FIG.2
FIG.4
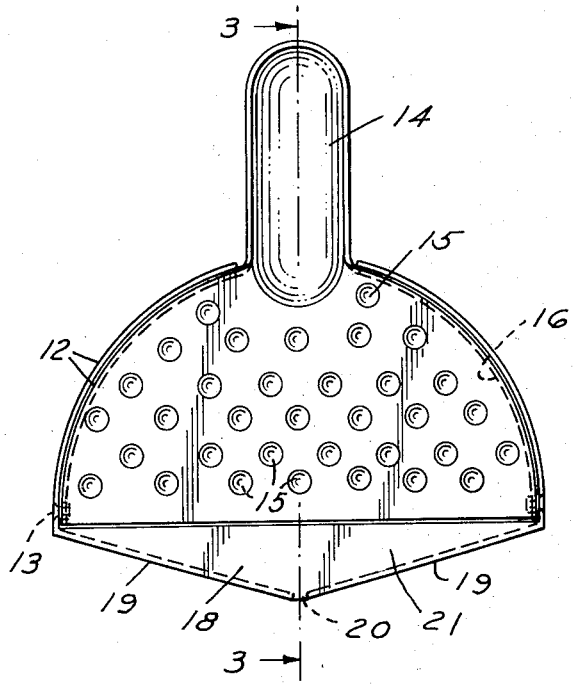
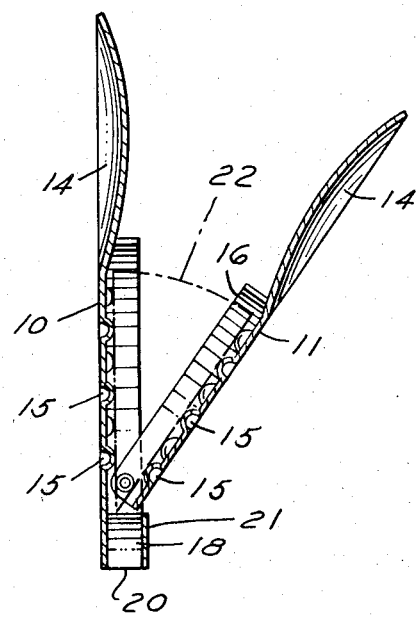
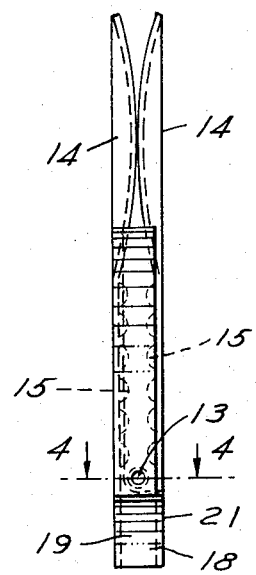
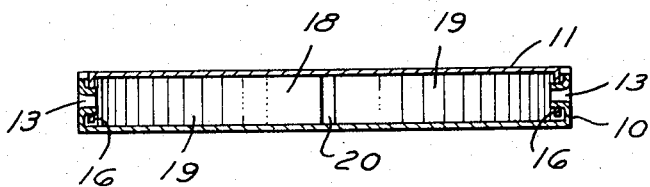
INVENTOR
MAHMOUD A. ELSHAZLY
BY
Whittemore Hulbert + Belknap
ATTORNEYS

TABLEWARE JUICE DISPENSER

BACKGROUND OF THE INVENTION

The field of the invention is lemon wedge squeezers which have heretofore been suggested for table use but in a different form than the present improvement. In the prior art, U.S. Pat. No. 2,015,142 has a central spike with hinged plates on opposite sides thereof. U.S. Pat. No. 1,875,678 has jaws of the same area as a lemon wedge. U.S. Pat. No 1,367,649 is a squeezer formed by pivoting together a fork and a spoon.

SUMMARY OF THE INVENTION

The present invention is an improvement over the lemon squeezers of the prior art and among the advantages are the provision of a juice collector at the hinge end of the squeezer so designed as to prevent the extracted juice from squirting in an undesired direction and ensuring that it be directed to the desired point on the food on container.

DRAWINGS

FIG. 1 is a plan view.
FIG. 2 is a side view.
FIG. 3 is a cross section on the line 3—3 of FIG. 1, showing a lemon wedge in position to be extracted.
FIG. 4 is a cross section on the line 4—4 of FIG. 2.

PREFERRED EMBODIMENT

The device of the invention has complementary lower and upper jaws 10 and 11 each with a semielliptical outer boundary 12. The jaws are connected together by a hinge pin 13 and each jaw has a finger grip 14 extending in a direction opposite the hinge and perpendicular to the major axis of the ellipse. The jaws can be fabricated from sheet metal, for example, stainless steel 16 to 20 gage. The inner surfaces of each jaw are roughened, for example, by a series of dimples 15 which can be formed by stamping thereby producing corresponding depressions in the outer surfaces. The inside surface of the upper jaw is provided with an inturned semielliptical flange 16, slightly smaller in size than the corresponding flange on the lower jaw so that it fits within the same. Beyond the hinge 13, the lower jaw 10 has an extension forming a juice-collecting pan 18. The pan has sides 19 which taper inwardly as shown in FIG. 1 forming an apex or nose having an opening 20 therein to permit the juice to be directed to the place where it is desired to deposit the same. The pan is completely closed by the cover plate 21 which extends from the nose opening 20 to the upper jaw when in open position.

In operation, a wedge of lemon 22 is inserted between the open jaws. The jaws are then closed so that the wedge is retained within the semielliptical flanges 16 until ready for extraction. When it is desired to apply lemon juice to food, the operator grasps the finger grips with the thumb and one of the fingers and holds the utensil in a substantially vertical position with the nose opening adjacent the location when the juice is to be applied. By applying manual pressure, the jaws squeeze the lemon wedge to the extent necessary to extract the desired quantity of juice which passes thru the collecting pan and is applied to the desired location.

What I claim as my invention is:

1. A tableware utensil for extracting juice from a wedge of citrus fruit comprising a pair of hingedly connected jaws having faces for engaging the sides of said wedge, outwardly extending finger grips projecting from the respective jaws, and a juice-collecting pan extending oppositely to said finger grips beyond said hinged connection, said pan and one of said jaws being integral and of one piece construction and having the portion thereof which extends beyond the hinged connection completely closed by top and bottom walls together with tapering sidewalls which converge to form a pointed nose provided with a nose opening for dispensing the juice.

* * * * *